United States Patent
Wang et al.

(10) Patent No.: US 9,897,487 B2
(45) Date of Patent: Feb. 20, 2018

(54) COMBINED LEG STRUCTURE OF MICRO BRIDGE UNIT OF FOCAL PLANE ARRAY

(71) Applicant: Wuxi Aleader Intelligent Technology Co., LTD, Wuxi, Jiangsu (CN)

(72) Inventors: Tao Wang, Jiangsu (CN); Liangzhong Wei, Jiangsu (CN); Wanglong Zhu, Jiangsu (CN); Yan Liu, Jiangsu (CN)

(73) Assignee: Wuxi Aleader Intelligent Technology Co., LTD, Wuxi, Jiangsu (CN)

( * ) Notice: Subject to any disclaimer, the term of this patent is extended or adjusted under 35 U.S.C. 154(b) by 277 days.

(21) Appl. No.: 14/963,822

(22) Filed: Dec. 9, 2015

(65) Prior Publication Data

US 2016/0097675 A1 Apr. 7, 2016

(30) Foreign Application Priority Data

Aug. 26, 2015 (CN) .......................... 2015 1 0532320

(51) Int. Cl.
  *G01J 5/02* (2006.01)
  *G01J 5/04* (2006.01)
(52) U.S. Cl.
  CPC .............. *G01J 5/024* (2013.01); *G01J 5/046* (2013.01)

(58) Field of Classification Search
  CPC ................................ G01J 5/024; G01J 5/046
  See application file for complete search history.

(56) References Cited

U.S. PATENT DOCUMENTS

| 9,677,946 B1* | 6/2017 | Egerton | G01J 5/24 |
| 2007/0108383 A1* | 5/2007 | Combes | G01J 5/44 250/338.1 |
| 2015/0021479 A1* | 1/2015 | Cai | G01J 5/20 250/338.4 |

\* cited by examiner

*Primary Examiner* — Francis M Legasse, Jr.

(57) ABSTRACT

A combined leg structure of a micro bridge unit of a focal plane array adopts a conductive polymer film or a doped conductive polymer film to serve as an extraction electrode in the micro bridge unit of the focal plane array, which contacts a vanadium oxide thermosensitive film or a doped vanadium oxide thermosensitive film of a bridge surface layer, so as to electrically connect the thermosensitive film of the micro bridge unit with a read-out circuit. The combined leg structure includes three layers: respectively an upper SiNx film layer, a lower SiNx film layer and a middle layer of the conductive polymer film or the doped conductive polymer film. The present invention adopts the conductive polymer film or the doped conductive polymer film having a low thermal conductivity to serve as an electrode material. A bridge leg absorption structure is arranged in the combined leg structure.

20 Claims, 1 Drawing Sheet

COMBINED LEG STRUCTURE OF MICRO BRIDGE UNIT OF FOCAL PLANE ARRAY

CROSS REFERENCE OF RELATED APPLICATION

The present invention claims priority under 35 U.S.C. 119(a-d) to CN 201510532320.6, filed Aug. 26, 2015.

BACKGROUND OF THE PRESENT INVENTION

Field of Invention

The present invention relates to a technical field of photoelectric detection, and more particularly to a combined leg structure of a micro bridge unit of a focal plane array.

Description of Related Arts

Because of the advantages of: (a) a low 1/f noise, (b) a high temperature coefficient of resistance (TCR), and (c) a good process compatibility with the micro-electro-mechanical system (MEMS), the vanadium oxide film, as the thermal resistance sensitive film, is widely applied for the preparation of the microbolometer uncooled focal plane array and the corresponding uncooled detector with the excellent detection performance. The vanadium oxide, as the sensitive material, is also applied in the manufacture of the THz detection focal plane array for an object detection and identification in the THz band (0.1-10 THz). Moreover, due to the distinct phase transition characteristics near the room temperature, the vanadium oxide film has the wide application prospect in the fields of the temperature sensor, the gas sensor, the electrochromic device and the optical switch.

The arrayed sensitive unit structure is widely adopted by the high-performance detectors and sensors. The concrete form of the array structure depends on the application request of the device. Taking the uncooled focal plane array based on the vanadium oxide sensitive film as an example, the focal plane array generally comprises a set of the two-dimensional micro bridge unit arrays, wherein each micro bridge unit comprises a sensitive area and two bridge legs for supporting. The bridge legs are not only for mechanically supporting the sensitive area, but also is the extraction electrode of the sensitive area and the important thermal conduction pathway. The radiation of the detected object is projected to the sensitive unit and then absorbed, increasing the temperature of the sensitive area; meanwhile, the heat flows to the surrounding environment through the thermal conduction, the thermal convection and the thermal radiation. The flow of the heat decreases the temperature rise range of the sensitive area, so as to decrease the response of the detector. Thus, in order to achieve the high detection performance, the array is generally sealed in the vacuumed shell and each micro bridge unit of the array is isolated from each other. Accordingly, the thermal conduction through the bridge legs to the substrate becomes the main heat loss manner of the micro bridge unit. The temperature rise of the sensitive unit leads to the change of the resistance of the thermosensitive film. And the change of the resistance is probed by means of the high-electricity-conductivity film layer inside the bridge legs as the extraction electrode, thus the object is detected.

In order to obtain high-performance uncooled focal plane arrays, the electrode material of the micro bridge unit thereof is generally required to have the high electricity conductivity, the low thermal conductivity and the preparation method liable to get the good compatibility with the MEMS process and the integrated circuit (IC) process. Conventionally, the common electrode materials of the vanadium oxide focal plane array include NiCr films and Ti films. Because of the good oxidation resistance, the NiCr film is the most common electrode material of the vanadium oxide focal plane array. However, the NiCr film has the large elasticity modulus, which leads to the large residual stress and accordingly the warping of the array unit. Moreover, it is difficult to pattern the NiCr film through the conventional dry etching tool and process, which decreases the process compatibility of the NiCr film to a certain extent. The Ti film is liable to be patterned and has the appropriate electricity conductivity and the thermal conductivity. However, the Ti film is liable to be oxidized, which affects the process compatibility of the Ti film. Thus, it is necessary to develop an electrode material to further improve the detection performance of the vanadium oxide focal plane array.

Moreover, in the conventional focal plane array structure, the bridge leg is regarded as the main heat loss pathway of the micro bridge unit. The micro bridge unit absorbs the infrared radiation, leading to the temperature rise of sensitive area; meanwhile, the temperature difference between the sensitive area and the bridge leg further leads to the heat loss from the sensitive area to the bridge leg and the inhibition of the final value of the temperature rise of the sensitive area. In order to decrease the heat loss from the bridge surface to the bridge leg, the design of the bridge leg usually adopts the strategy of the overlong bridge leg structure or the narrow bridge leg. However, the length of the bridge leg is limited by the design requirements of the duty cycle and the mechanical stability of the micro bridge unit. The width of the conventional bridge leg reaches 0.5 μm, and the manufacture cost of the focal plane array will greatly increase if the width of the bridge leg is further decreased. It is necessary to design a bridge leg structure to decrease the heat loss of the bridge leg, which provides a new choice to realize the high-performance vanadium oxide foal plane array.

SUMMARY OF THE PRESENT INVENTION

An object of the present invention is to provide a combined leg structure of a micro bridge unit, having a high electricity conductivity, a low thermal conductivity and a high infrared absorptance. The fabrication of the combined leg structure is compatible with a micro-electro-mechanical system (MEMS) process of an uncooled focal plane array device, and applicable in a mass production of the device.

Technical solutions of the present invention are described as follows.

A combined leg structure of a micro bridge unit of a focal plane array is provided, wherein:

the combined leg structure adopts a conductive polymer film or a doped conductive polymer film to serve as an extraction electrode in the micro bridge unit of the focal plane array, for contacting an electrode contact hole of a vanadium oxide thermosensitive film or a doped vanadium oxide thermosensitive film on a bridge surface layer; and the extraction electrode electrically connects the vanadium oxide thermosensitive film or the doped vanadium oxide thermosensitive film with a read-out circuit of the focal plane array.

Preferably, the conductive polymer is polyacetylene, polythiophene, polypyrrole or polyaniline.

Preferably, a dopant of the doped conductive polymer is a Lewis acid or a protonic acid. Further preferably, the Lewis acid is ferric trichloride; and the protonic acid is sulfamic acid.

Preferably, a bridge leg absorption structure is arranged in the combined leg structure of the micro bridge unit near the bridge surface layer of the micro bridge unit. The vanadium oxide thermosensitive film or the doped vanadium oxide thermosensitive film has the electrode contact hole thereon. A first side of the bridge leg absorption structure is connected with the electrode contact hole through a first bridge leg. A second side of the bridge leg absorption structure is connected with a bridge column hole in the micro bridge unit through a second bridge leg.

Preferably, the bridge leg absorption structure, the first bridge leg and the second bridge leg respectively comprise three-layer films: an upper SiNx film, the conductive polymer film or the doped conductive polymer film as the extraction electrode, and a lower SiNx film.

Preferably, the upper SiNx film, the conductive polymer film or the doped conductive polymer film, and the lower SiNx film respectively have a thickness of 50-100 nm, 50-150 nm and 100-200 nm.

Preferably, a length and a width of the bridge leg absorption structure are respectively 10-20% of a length and a width of the micro bridge unit.

Preferably, the first bridge leg has a width of 0.5-1.0 µm and a length of 3.0-5.0 µm.

Preferably, the first bridge leg Two has a width of 0.8-2.0 µm, and a length of the second bridge leg is determined according to a size of the micro bridge unit and the length of the bridge leg absorption structure.

Further preferably, the upper SiNx film is prepared through a radio frequency sputtering process or a chemical vapor deposition process at a processing temperature of not higher than 200° C.

The present invention has following benefits.

Firstly, the combined leg structure of the micro bridge unit provided by the present invention adopts the conductive polymer film or the doped conductive polymer film to serve as an electrode material of the micro bridge unit. The conductive polymer film or the doped conductive polymer film has a lower thermal conductivity than a conventional electrode material, such as a NiCr film and a Ti film, by about one order of magnitude, which facilies decreasing the thermal conductivity of the combined leg structure of the micro bridge unit and increasing a sensitivity of the uncooled focal plane array device.

Secondly, the bridge leg absorption structure is arranged in the combined leg structure of the micro bridge unit provided by the present invention. The bridge leg absorption structure facilies decreasing a heat loss rate of the sensitive area of the micro bridge unit, which is beneficial to increase the sensitivity of the uncooled focal plane array device.

Thirdly, the present invention has the good process compatibility. The conductive polymer film or the doped conductive polymer film is liable to be patterned through a conventional lithography process, which guarantees the good process compatibility between a preparation of the micro bridge unit and the MEMS process.

Fourthly, the conductive polymer film or the doped conductive polymer film is liable to be prepared through a spin-coating process, which decreases a manufacture cost of the extraction electrode of the micro bridge unit of the focal plane array.

These and other objectives, features, and advantages of the present invention will become apparent from the following detailed description, the accompanying drawings, and the appended claims.

BRIEF DESCRIPTION OF THE DRAWINGS

To illustrate clearly the technical solutions according to the preferred embodiments of the present invention, the accompanying drawings for describing the preferred embodiment of the present invention are given below. Apparently, the accompanying drawings in the following description are only some embodiments of the present invention, and persons of ordinary skill in the art can derive other drawings from the accompanying drawings without creative efforts.

In the figures.

11-first bridge leg; 12-second bridge leg; 13-bridge leg absorption structure; 2-bridge surface layer; 21-electrode contact hole; 3-bridge column hole;

$W_1$-width of second bridge leg; $W_2$-distance between edge of bridge leg absorption structure and edge of bridge surface layer;

$L_1$-length of first bridge leg; $L_2$-length of bridge leg absorption structure;

$t_1$-width of first bridge leg; $t_2$-width of bridge leg absorption structure;

$d_1$-distance between first bridge leg and edge of bridge surface layer;

C1-upper SiNx film layer; C2-conductive polymer film or doped conductive polymer film layer; C3-lower SiNx film layer;

$h_1$-film thickness of upper SiNx film layer; $h_2$-film thickness of conductive polymer film or doped conductive polymer film layer; and $h_3$-film thickness of lower SiNx film layer.

DETAILED DESCRIPTION OF THE PREFERRED EMBODIMENT

The present invention is further described with accompanying drawings and detailed preferred embodiments.

Figure 1:
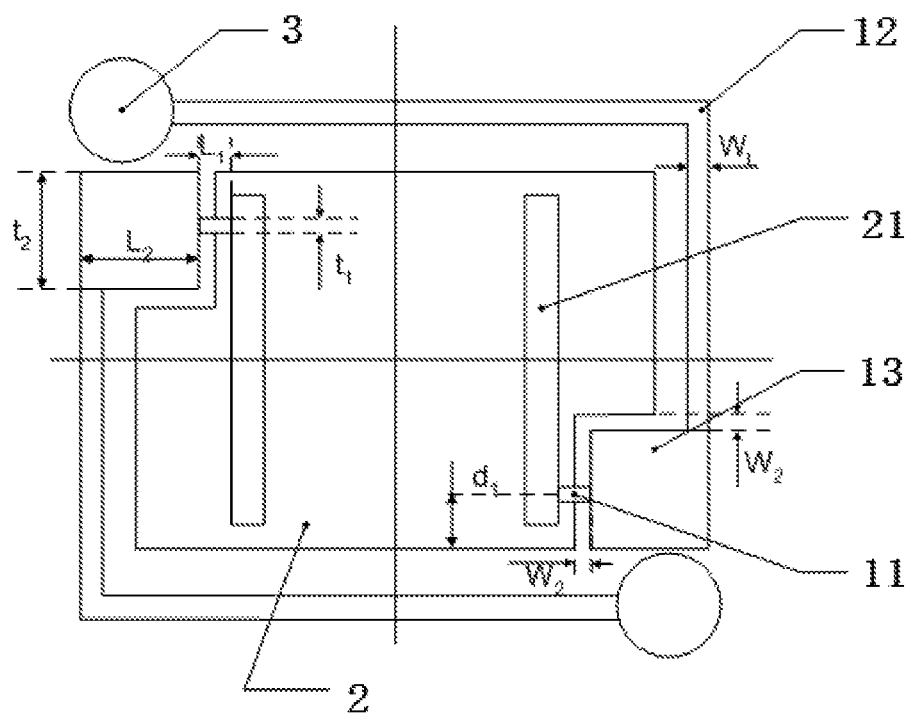
FIG. 1 is a sketch view of a projection of a micro bridge unit based on a combined leg structure according to preferred embodiments of the present invention.

Taking an L-shaped bridge leg as an example, FIG. 1 shows a sketch view of a projection of a micro bridge unit of a focal plane array obtained based on a combined leg structure provided by the present invention.

First Preferred Embodiment

The first preferred embodiment prepares a 128×128 focal plane array bridge structure with a micro bridge unit of 50×50 µm on a substrate through a micro-electro-mechanical system (MEMS) process, comprising steps of:

(1) preparing a first SiNx film having a film thickness of 100 nm through a chemical vapor deposition process;

(2) depositing a layer of a vanadium oxide film having a film thickness of 100 nm and a film sheet resistance of 100 kΩ/□ on the first SiNx film obtained by the step (1) through a reactive sputtering process, and forming a vanadium oxide thermosensitive film bridge surface layer 2;

(3) preparing a second SiNx film having a film thickness of 50 nm on the vanadium oxide thermosensitive film bridge surface layer obtained by the step (2) through the chemical vapor deposition process;

(4) opening an electrode contact hole 21 on the second SiNx film obtained by the step (3) through a lithography process and a reactive ion etching process;

(5) bombarding the electrode contact hole obtained by the step (4) for 1 min by an Ar ion beam having an energy of 300 eV and a beam density of 5 mA/cm$^2$; and preparing a polyacetylene film through a spin-coating process, having a film thickness of 80 nm, wherein the polyacetylene film serves as an extraction electrode to contact the vanadium oxide film;

(6) preparing a third SiNx film Cl having a film thickness of 80 nm on the polyacetylene film obtained by the step (5) through the chemical vapor deposition process at a temperature of 180° C.; and (7) patterning a structure obtained by the step (6) through the lithography process and the reactive ion etching process, so as to form the micro bridge unit of an uncooled infrared focal plane array, having an electrode material of the polyacetylene film and a thermosensitive film of the vanadium oxide film; and finally forming the uncooled infrared focal plane array.

In the step (7), a combined leg structure is formed by patterning. As shown in FIG. 1, the combined leg structure comprises a second bridge leg 12 connected with a bridge column hole 3, wherein: the second bridge leg 12 is connected with a first side of a bridge leg absorption structure 13; a second side of the bridge leg absorption structure 13 is connected with the electrode contact hole 21 through a first bridge leg 11; and the bridge leg absorption structure 13 is arranged near the bridge surface layer 2.

As shown in FIG. 1, according to the first preferred embodiment of the present invention, the bridge leg absorption structure 13 is rectangular, having a length $L_2$ of 7.0 μm and a width $t_2$ of 5.0 μm. A distance $W_2$ between an edge of the bridge leg absorption structure 13 and an edge of the bridge surface layer 2 is 1.5 μm. The first bridge leg 11 has a width $t_1$ of 0.8 μm and a length $L_1$ of 3.0 μm. A distance $d_1$ between the first bridge leg 11 and the edge of the bridge surface layer 2 is 2.5 μm. The second bridge leg 12 has a width $W_1$ of 1.2 μm, and a length of the second bridge leg is determined according to a size of the micro bridge unit and the length of the bridge leg absorption structure 13.

Figure 2:
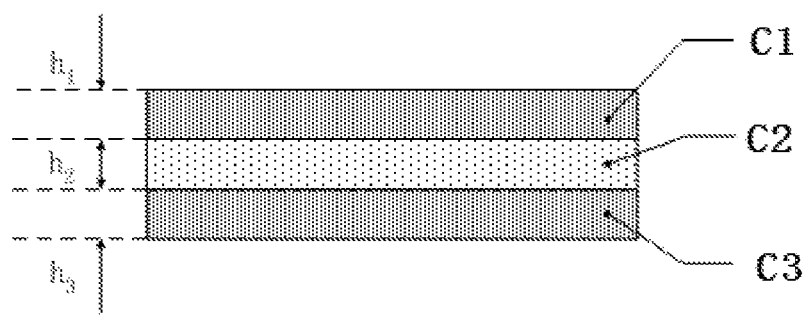
FIG. 2 is a structural sketch view of three-layer films of the combined leg structure according to the preferred embodiments of the present invention.

As shown in FIG. 2, the bridge leg absorption structure 13, the first bridge leg 11 and the second bridge leg 12 comprise three layers, from top to bottom, respectively a C1 layer, a C2 layer and a C3 layer. The C1 layer is a layer of the third SiNx film obtained by the step (6); the C2 layer is a layer of the polyacetylene film obtained by the step (5); and the C3 layer is a layer of the first SiNx film obtained by the step (1). According to the first preferred embodiment of the present invention, the C1 layer, the C2 layer and the C3 layer respectively have a thickness $h_1$, $h_2$ and $h_3$ of 80 nm, 80 nm and 100 nm. The polyacethlene film serves as the extraction electrode in the micro bridge unit of the focal plane array, which contacts the vanadium oxide thermosensitive film on the bridge surface layer of the micro bridge unit, so as to electrically connect the thermosensitive film with the bridge column hole.

After being vacuum-packaged, the obtained focal plane array is processed with a performance test by a bias pulse of 6 μs and 150 μA at a working temperature of 25° C. A noise equivalent temperature difference (NETD) of the focal plane array device is 46 mK.

Second Preferred Embodiment

The second preferred embodiment prepares a 128×128 focal plane array bridge structure with a micro bridge unit of 50×50 μm on a substrate through a MEMS process.

The second preferred embodiment differs from the first preferred embodiment in that:

in the step (5), a sulfamic-acid-doped polyaniline film having a film thickness of 100 nm is prepared through a spin-coating process, wherein the sulfamic-acid-doped polyaniline film serves as an extraction electrode to contact the vanadium oxide film;

in the step (6), a third SiNx film having a film thickness of 80 nm is prepared through a radio frequency sputtering process at a temperature of 150° C.; and finally, an uncooled infrared focal plane array, having an electrode material of the sulfamic-acid-doped polyaniline film and a thermosensitive film of the vanadium oxide film, is formed.

As shown in FIG. 1, according to the second preferred embodiment of the present invention, the bridge leg absorption structure is rectangular and has a length $L_2$ of 7.0 μm and a width $t_2$ of 7.0 μm. A distance $W_2$ between an edge of the bridge leg absorption structure and an edge of the bridge surface layer is 1.5 μm. The first bridge leg has a width $t_1$ of 0.8 μm and a length $L_1$ of 5.0 μm. A distance $d_1$ between the first bridge leg and the edge of the bridge surface layer is 3.0 μm. The second bridge leg has a width $W_1$ of 1.2 μm.

As shown in FIG. 2, the bridge leg absorption structure 13, the first bridge leg 11 and the second bridge leg 12 comprise three layers, from top to bottom, respectively a C1 layer, a C2 layer and a C3 layer. The C1 layer is a layer of the third SiNx film obtained by the step (6); the C2 layer is a layer of the sulfamic-acid-doped polyaniline film obtained by the step (5); and the C3 layer is a layer of the first SiNx film obtained by the step (1). According to the second preferred embodiment of the present invention, the C1 layer, the C2 layer and the C3 layer respectively have a thickness $h_1$, $h_2$ and $h_3$ of 80 nm, 100 nm and 100 nm. The sulfamic-acid-doped polyaniline film serves as the extraction electrode in the micro bridge unit of the focal plane array, which contacts the vanadium oxide thermosensitive film on the bridge surface layer of the micro bridge unit, so as to electrically connect the thermosensitive film with the bridge column hole.

After being vacuum-packaged, the obtained focal plane array is processed with a performance test by a bias pulse of 6 μs and 150 μA at a working temperature of 25° C. A NETD of the focal plane array device is 37 mK.

Third Preferred Embodiment

The third preferred embodiment prepares a 128×128 focal plane array bridge structure with a micro bridge unit of 50×50 μm on a substrate through a MEMS process.

The third preferred embodiment differs from the first preferred embodiment in that:

in the step (5), a ferric-trichloride-doped poly(3-methylthiophene) film is prepared through a spin-coating process, having a film thickness of 100 nm, wherein the ferric-trichloride-doped poly(3-methylthiophene) film serves as an extraction electrode to contact the vanadium oxide film;

in the step (6), a third SiNx film having a film thickness of 60 nm is prepared through a radio frequency sputtering process at a temperature of 150° C.; and finally, an uncooled infrared focal plane array, having an electrode material of the ferric-trichloride-doped poly(3-methylthiophene) film and a thermosensitive film of the vanadium oxide film, is formed.

As shown in FIG. 1, according to the third preferred embodiment of the present invention, the bridge leg absorption structure is rectangular and has a length $L_2$ of 6.0 μm and a width $t_2$ of 6.0 μm. A distance $W_2$ between an edge of the bridge leg absorption structure and an edge of the bridge surface layer is 1.5 μm. The first bridge leg has a width $t_1$ of 0.6 μm and a length $L_1$ of 3.0 μm. A distance $d_1$ between the first bridge leg and the edge of the bridge surface layer is 3.0 µm. The second bridge leg has a width $W_1$ of 1.2 µm.

As shown in FIG. 2, the bridge leg absorption structure 13, the first bridge leg 11 and the second bridge leg 12 comprise three layers, from top to bottom, respectively a C1 layer, a C2 layer and a C3 layer. The C1 layer is a layer of the third SiNx film obtained by the step (6); the C2 layer is a layer of the ferric-trichloride-doped poly(3-methylthiophene) film obtained by the step (5); and the C3 layer is a layer of the first SiNx film obtained by the step (1). According to the third preferred embodiment of the present invention, the C1 layer, the C2 layer and the C3 layer respectively have a thickness $h_1$, $h_2$ and $h_3$ of 60 nm, 100 nm and 100 nm. The ferric-trichloride-doped poly(3-methylthiophene) film serves as the extraction electrode in the micro bridge unit of the focal plane array, which contacts the vanadium oxide thermosensitive film on the bridge surface layer of the micro bridge unit, so as to electrically connect the thermosensitive film with the bridge column hole.

After being vacuum-packaged, the obtained focal plane array is processed with a performance test by a bias pulse of 6 µs and 150 µA at a working temperature of 25° C. A NETD of the focal plane array device is 42 mK.

Fourth Preferred Embodiment

The fourth preferred embodiment prepares a 128×128 focal plane array bridge structure with a micro bridge unit of 50×50 µm on a substrate through a MEMS process.

The fourth preferred embodiment differs from the first preferred embodiment in that:

in the step (5), a polypyrrole film having a film thickness of 100 nm is prepared through a spin-coating process, wherein the polylyrrole film serves as an extraction electrode to contact the vanadium oxide film;

in the step (6), a SiNx passivation layer film having a film thickness of 50 nm is prepared through a radio frequency sputtering process at a temperature of 120° C.; and finally, an uncooled infrared focal plane array, having an electrode material of the polypyrrole film and a thermosensitive film of the vanadium oxide film, is formed.

As shown in FIG. 1, according to the fourth preferred embodiment of the present invention, the bridge leg absorption structure 13 is rectangular and has a length $L_2$ of 9.0 µm and a width $t_2$ of 9.0 µm. A distance $W_2$ between an edge of the bridge leg absorption structure 13 and an edge of the bridge surface layer 2 is 1.5 µm. The first bridge leg 11 has a width $t_1$ of 1.0 µm and a length $L_1$ of 4.0 µm. A distance $d_1$ between the first bridge leg 11 and the edge of the bridge surface layer is 4.0 µm. The second bridge leg has a width % of 1.2 µm.

As shown in FIG. 2, the bridge leg absorption structure 13, the first bridge leg 11 and the second bridge leg 12 comprise three layers, from top to bottom, respectively a C1 layer, a C2 layer and a C3 layer. The C1 layer is a layer of the SiNx passivation layer film obtained by the step (6); the C2 layer is a layer of the polypyrrole film obtained by the step (5); and the C3 layer is a layer of the first SiNx film obtained by the step (1). According to the fourth preferred embodiment of the present invention, the C1 layer, the C2 layer and the C3 layer respectively have a thickness $h_1$, $h_2$ and $h_3$ of 50 nm, 100 nm and 100 nm. The polypyrrole film serves as the extraction electrode in the micro bridge unit of the focal plane array, which contacts the vanadium oxide thermosensitive film of the bridge surface layer on the micro bridge unit, so as to electrically connect the thermosensitive film with the bridge column hole.

After being vacuum-packaged, the obtained focal plane array is processed with a performance test by a bias pulse of 6 µs and 150 µA at a working temperature of 25° C. A NETD of the focal plane array device is 51 mK.

One skilled in the art will understand that the embodiment of the present invention as shown in the drawings and described above is exemplary only and not intended to be limiting. This invention includes all modifications encompassed within the spirit and scope of the following claims.

What is claimed is:

1. A combined leg structure for a micro bridge unit of a focal plane array, wherein said combined leg structure for the micro bridge unit adopts a conductive polymer film or a doped conductive polymer to serve as an extraction electrode in the micro bridge unit of the focal plane array, for contacting a vanadium oxide thermosensitive film or a doped vanadium oxide thermosensitive film on a bridge surface layer, so as to electrically connect the vanadium oxide thermosensitive film or the doped vanadium oxide thermosensitive film with a read-out circuit of the focal plane array.

2. The combined leg structure for the micro bridge unit of the focal plane array, as recited in claim 1, wherein said conductive polymer is polyacetylene, polythiophene, polypyrrole, or polyaniline.

3. The combined leg structure for the micro bridge unit of the focal plane array, as recited in claim 1, wherein a dopant of said doped conductive polymer is a Lewis acid or a protonic acid.

4. The combined leg structure for the micro bridge unit of the focal plane array, as recited in claim 1, wherein a bridge leg absorption structure is arranged in said combined leg structure for the micro bridge unit near the bridge surface layer of the micro bridge unit; a first side of said bridge leg absorption structure is connected with an electrode contact hole through a first bridge leg; and a second side of said bridge leg absorption structure is connected with a bridge column hole in the micro bridge unit through a second bridge leg.

5. The combined leg structure for the micro bridge unit of the focal plane array, as recited in claim 2, wherein a bridge leg absorption structure is arranged in said combined leg structure for the micro bridge unit near the bridge surface layer of the micro bridge unit; a first side of said bridge leg absorption structure is connected with an electrode contact hole through a first bridge leg; and a second side of said bridge leg absorption structure is connected with a bridge column hole in the micro bridge unit through a second bridge leg.

6. The combined leg structure for the micro bridge unit of the focal plane array, as recited in claim 3, wherein a bridge leg absorption structure is arranged in said combined leg structure for the micro bridge unit near the bridge surface layer of the micro bridge unit; a first side of said bridge leg absorption structure is connected with an electrode contact hole through a first bridge leg; and a second side of said bridge leg absorption structure is connected with a bridge column hole in the micro bridge unit through a second bridge leg.

7. The combined leg structure for the micro bridge unit of the focal plane array, as recited in claim 4, wherein said first bridge leg, said bridge leg absorption structure and said second bridge leg respectively comprise three layers, from top to bottom, respectively an upper SiNx film layer, a layer of said conductive polymer film or a layer of said doped conductive polymer film as said extraction electrode and a lower SiNx film layer.

8. The combined leg structure for the micro bridge unit of the focal plane array, as recited in claim 5, wherein said first bridge leg, said bridge leg absorption structure and said second bridge leg respectively comprise three layers, from top to bottom, respectively an upper SiNx film layer, a layer of said conductive polymer film or a layer of said doped conductive polymer film as said extraction electrode and a lower SiNx film layer.

9. The combined leg structure for the micro bridge unit of the focal plane array, as recited in claim 6, wherein said first bridge leg, said bridge leg absorption structure and said second bridge leg respectively comprise three layers, from top to bottom, respectively an upper SiNx film layer, a layer of said conductive polymer film or a layer of said doped conductive polymer film as said extraction electrode and a lower SiNx film layer.

10. The combined leg structure for the micro bridge unit of the focal plane array, as recited in claim 7, wherein said upper SiNx film, said layer of said conductive polymer film or said doped conductive polymer film, and said lower SiNx film layer respectively have a film thickness of 50-100 nm, 50-150 nm, and 100-200 nm.

11. The combined leg structure for the micro bridge unit of the focal plane array, as recited in claim 8, wherein said upper SiNx film, said layer of said conductive polymer film or said doped conductive polymer film, and said lower SiNx film layer respectively have a film thickness of 50-100 nm, 50-150 nm, and 100-200 nm.

12. The combined leg structure for the micro bridge unit of the focal plane array, as recited in claim 9, wherein said upper SiNx film, said layer of said conductive polymer film or said doped conductive polymer film, and said lower SiNx film layer respectively have a film thickness of 50-100 nm, 50-150 nm, and 100-200 nm.

13. The combined leg structure for the micro bridge unit of the focal plane array, as recited in claim 7, wherein a length and a width of said bridge leg absorption structure are respectively 10-20% of a length and a width of the micro bridge unit.

14. The combined leg structure for the micro bridge unit of the focal plane array, as recited in claim 10, wherein a length and a width of said bridge leg absorption structure are respectively 10-20% of a length and a width of the micro bridge unit.

15. The combined leg structure for the micro bridge unit of the focal plane array, as recited in claim 7, wherein said first bridge leg has a width of 0.5-1.0 μm and a length of 3.0-5.0 μm.

16. The combined leg structure for the micro bridge unit of the focal plane array, as recited in claim 10, wherein said first bridge leg has a width of 0.5-1.0 μm and a length of 3.0-5.0 μm.

17. The combined leg structure for the micro bridge unit of the focal plane array, as recited in claim 7, wherein said second bridge leg has a width of 0.8-2.0 μm; and a length of said second bridge leg is determined according to a size of the micro bridge unit and a length of said bridge leg absorption structure.

18. The combined leg structure for the micro bridge unit of the focal plane array, as recited in claim 10, wherein said second bridge leg has a width of 0.8-2.0 μm; and a length of said second bridge leg is determined according to a size of the micro bridge unit and a length of said bridge leg absorption structure.

19. The combined leg structure for the micro bridge unit of the focal plane array, as recited in claim 7, wherein said upper SiNx film layer is prepared through a radio frequency sputtering process or a chemical vapor deposition process at a processing temperature of not higher than 200° C.

20. The combined leg structure for the micro bridge unit of the focal plane array, as recited in claim 10, wherein said upper SiNx film layer is prepared through a radio frequency sputtering process or a chemical vapor deposition process at a processing temperature of not higher than 200° C.

\* \* \* \* \*